United States Patent
Lu et al.

(10) Patent No.: US 10,046,976 B1
(45) Date of Patent: Aug. 14, 2018

(54) METHOD OF MAKING INORGANIC GOLD COMPOUND

(71) Applicant: TRIPOD TECHNOLOGY CORPORATION, Taoyuan (TW)

(72) Inventors: Lin Lu, Taoyuan (TW); Chen-Hsiang Wang, Taoyuan (TW); Kuei-Sheng Fan, Taoyuan (TW); Cheng-Ding Wang, Taoyuan (TW); Jim-Min Fang, Taoyuan (TW)

(73) Assignee: TRIPOD TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 15/415,391

(22) Filed: Jan. 25, 2017

(51) Int. Cl.
*C01G 7/00* (2006.01)
*C01C 3/10* (2006.01)

(52) U.S. Cl.
CPC . *C01C 3/10* (2013.01); *C01G 7/00* (2013.01)

(58) Field of Classification Search
CPC .................................. C01G 7/00; C01C 3/10
See application file for complete search history.

(56) References Cited

U.S. PATENT DOCUMENTS

| | | | | |
|---|---|---|---|---|
| 4,439,235 A | * | 3/1984 | Simpson | C22B 11/04 423/22 |
| 4,941,917 A | * | 7/1990 | Cenegy | C22B 3/04 423/27 |
| 4,979,986 A | * | 12/1990 | Hill | C22B 1/00 366/317 |
| 5,147,617 A | * | 9/1992 | Touro | C01G 7/003 423/27 |
| 2004/0030198 A1 | * | 2/2004 | Tanaka | C07C 29/64 568/841 |
| 2010/0233068 A1 | * | 9/2010 | Grimland | B01J 19/26 423/478 |

FOREIGN PATENT DOCUMENTS

| | | |
|---|---|---|
| CN | 102774872 A | 11/2012 |
| CN | 103343224 A | 10/2013 |
| CN | 106119567 A | 11/2016 |
| WO | WO 2012/149631 A1 | 11/2012 |

OTHER PUBLICATIONS

King et al, "A Straightforward Route to Tetrachloroauric Acid from Gold Metal and Molecular Chlorine for Nanoparticle Synthesis", Metals 2015, 5, pp. 1454-1461.*

(Continued)

*Primary Examiner* — Ngoc-Yen Nguyen
(74) *Attorney, Agent, or Firm* — Birch, Stewart, Kolasch & Birch, LLP (57) ABSTRACT

A method of making the inorganic gold compound, such as tetrachloroauric acid, sodium tetrachloroaurate, potassium tetrachloroaurate, sodium tetracyanoaurate, and potassium tetracyanoaurate, includes the step of: treating gold with a halogen-containing oxidizing agent in a hydrochloric acid to obtain the inorganic gold compound, wherein the halogen-containing oxidizing agent excludes chlorine gas. The method of making the inorganic gold compound is simple, safe, time-effective, cost-effective, and environment-friendly, and has the advantage of high yield.

16 Claims, 8 Drawing Sheets

(56) References Cited

OTHER PUBLICATIONS

Baghalha, "Leaching of an oxide gold ore with chloride/hypochlorite solutions" International Journal of Mineral Processing, vol. 82, Jun. 2007, pp. 178-186.

Hojo, et al., "Pure gold dissolution in dilute chloric, bromic or iodic acid solution containing abundant halide ions" Journal of Molecular Liquids, vol. 227, 2017, pp. 295-302.

King, et al., "A Straightforward Route to Tetrachloroauric Acid from Gold Metal and Molecular Chlorine for Nanoparticle Synthesis" Metals, vol. 5, Aug. 18, 2015, pp. 1454-1461.

Nicol, et al., "The Chemistry of the Extraction of Gold", The Extractive Metallurgy of Gold in South Africa, vol. 2, 1987, pp. 831-905.

Yen, et al., "Hypochlorite Leaching of Gold Ore" Advances in Gold and Silver Processing, 1990, pp. 67-74.

* cited by examiner

METHOD OF MAKING INORGANIC GOLD COMPOUND

BACKGROUND

1. Technical Field

The present invention relates to a method of making an inorganic gold compound, and more particularly to a method of making an inorganic gold compound applicable in the fields of electronics, biotechnology, and medicines.

2. Description of the Prior Art(s)

Inorganic gold compounds including cloroauric acid, also called tetrachloroauric acid ($HAuCl_4$), and gold salts such as sodium tetrachloroaurate ($NaAuCl_4$), potassium tetrachloroaurate ($KAuCl_4$), sodium tetracyanoaurate [$NaAu(CN)_4$], and potassium tetracyanoaurate [$KAu(CN)_4$], are fine chemicals and are widely used in the preparation of various gold-containing catalysts, gold conductive adhesives, and gold colloids (nanoparticles). Tetrachloroauric acid and gold salts are also utilized in chemical plating as the activation solution, in electroplating of gold and gold alloys, in coloring of glass and porcelain, in separation of rubidium, cesium and other elements, and as preservative for biomedicinal applications.

For the preparation of tetrachloroauric acid and gold salts, gold powder is served as the main raw material. For an effective production of tetrachloroauric acid and gold salts, the amount of gold dissolved in solution is a crucial factor. In addition, tetrachloroauric acid is also the key intermediate compound for the production of gold salts. However, with good physical and chemical properties, such as good corrosion resistance, good toughness, and good electric and thermal conductivity, gold is hardly dissolved in common acid solution or alkali solution.

For the production of tetrachloroauric acid, three conventional methods are provided.

Figure 8:
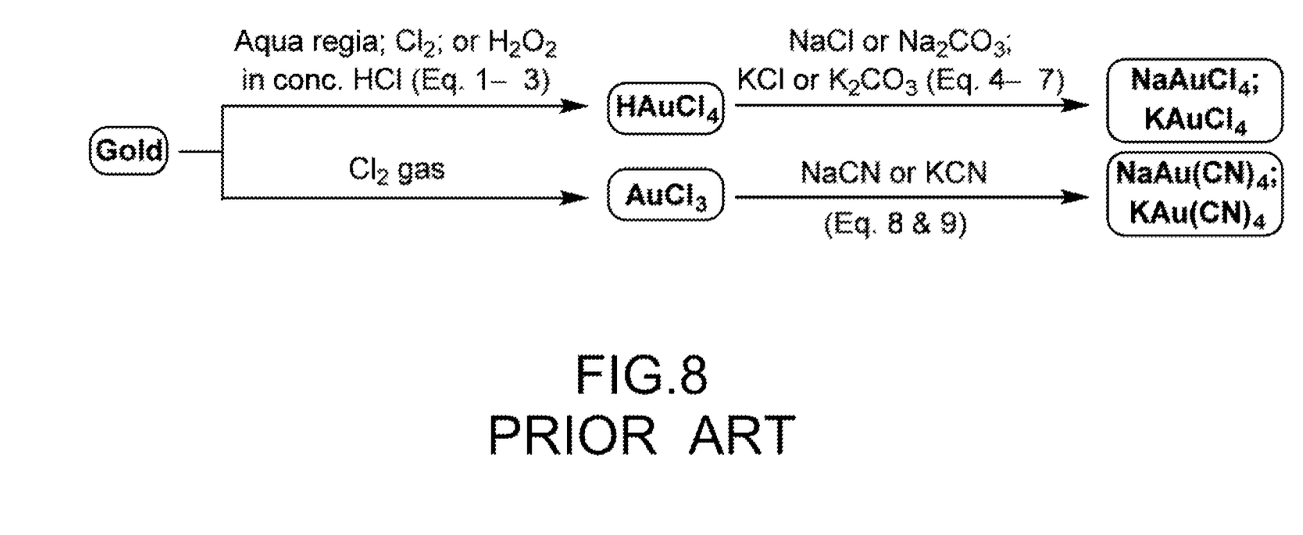
FIG. 8 is a schematic flow diagram of a method for making an inorganic compound containing gold in accordance with the prior art.

In the first method for the production of tetrachloroauric acid (see FIG. 8 and Equation 1), gold is dissolved and oxidized in excess aqua regia, which is a mixture of concentrated nitric acid ($HNO_3$) and concentrated hydrochloric acid (HCl) in a volume ratio of 1:3.

$$Au+HNO_3+4HCl \rightarrow HAuCl_4+NO+2H_2O \quad \text{(Eq. 1)}$$

After reaction, the solution is carefully evaporated at 100° C. to form a slurry. This process is repeated by addition of concentrated hydrochloric acid and evaporation until no brown gas of nitrogen oxides evolves. The product of tetrachloroauric acid is then dried to give orange needle-like crystals. During this process, a large amount of toxic nitrogen oxides is generated and the working environment is polluted.

In the second method for the production of tetrachloroauric acid, saturated chlorine is used as the oxidizing agent in hydrochloric acid (see FIG. 8 and Equation 2).

$$2Au+3Cl_2+2HCl \rightarrow 2HAuCl_4 \quad \text{(Eq. 2)}$$

As chlorine gas is a highly toxic and hazardous chemical, the using of chlorine gas has to follow the regulations and be monitored by the related management units of government. In addition, chlorine gas should be stored and operated in sealed equipment to prevent gas leakage, thus causing high cost of investment.

In the third method for the production of tetrachloroauric acid, hydrogen peroxide ($H_2O_2$) is served as the oxidizing agent in concentrated hydrochloric acid (see FIG. 8 and Equation 3).

$$2Au+3H_2O_2+8HCl \rightarrow 2HAuCl_4+6H_2O \quad \text{(Eq. 3)}$$

As the reaction of the third method is performed at 100° C., excess amounts (2 to 5 fold) of hydrogen peroxide and hydrochloride are required to compensate the loss of hydrogen peroxide and hydrochloride at such high temperature. Furthermore, hydrogen peroxide at high concentration, for example, 30 wt % in this reaction, is susceptible to thermal decomposition. One must take precaution for the potential hazard of explosion on handling hydrogen peroxide at 100° C. to produce tetrachloroauric acid.

For production of sodium tetrachloroaurate, a conventional method involves the addition of aqueous tetrachloroauric acid solution to sodium chloride (NaCl) or sodium carbonate ($Na_2CO_3$) to form a mixture (see FIG. 8 and Equations 4 and 5). The mixture is stirred at 100° C., and then subjected to evaporation, cooling, crystallization, and drying to obtain the orange crystals of sodium tetrachloroaurate.

$$HAuCl_4+NaCl \rightarrow NaAuCl_4+HCl \quad \text{(Eq. 4)}$$

$$2HAuCl_4+Na_2CO_3 \rightarrow 2NaAuCl_4+H_2O+CO_2 \quad \text{(Eq. 5)}$$

Similar to the conventional method for the production of sodium tetrachloroaurate, potassium tetrachloroaurate is produced as orange crystals from aqueous tetrachloroauric acid solution on treatment with potassium chloride (KCl) or potassium carbonate ($K_2CO_3$) at 100° C., followed by evaporation, cooling, crystallization, and drying (see FIG. 8 and Equations 6 and 7).

$$HAuCl_4+KCl \rightarrow KAuCl_4+HCl \quad \text{(Eq. 6)}$$

$$2HAuCl_4+K_2CO_3 \rightarrow 2KAuCl_4+H_2O+CO_2 \quad \text{(Eq. 7)}$$

However, in the above-described conventional methods for production of sodium tetrachloroaurate and potassium tetrachloroaurate, tetrachloroauric acid is served as the starting material and a prior manufacture of tetrachloroauric acid is required. Hence, the above-described conventional methods for production of sodium tetrachloroaurate or potassium tetrachloroaurate are rather complicate, time consuming, and unfavorable for large-scale production.

For the production of sodium tetracyanoaurate, a first conventional method involves the addition of sodium cyanide (NaCN) of a purity larger than 95% to a stirred aqueous solution of gold(III) chloride ($AuCl_3$) at a concentration of 100 g/L to 300 g/L (see FIG. 8 and Equation 8) to form a mixture. The molar ratio of sodium cyanide to gold(III) chloride is about 4.5 to 1.

$$AuCl_3+4NaCN \rightarrow NaAu(CN)_4+3NaCl \quad \text{(Eq. 8)}$$

At the end of the reaction shown by Equation 8, the mixture is heated for evaporation until a film layer appears on surface. The mixture is cooled to 5° C. to 30° C., filtered, and extracted with an appropriate organic solvent to give solid precipitate of sodium tetracyanoaurate. The organic phase containing the desired product of sodium tetracyanoaurate is separated from sodium chloride by filtration. The organic phase is added with water, and heated to remove organic solvent to obtain an aqueous solution containing sodium tetracyanoaurate of about 100 g/L to 500 g/L. The aqueous solution containing sodium tetracyanoaurate is concentrated by heating at 80° C. to 100° C. After standing at room temperature, the crystals of sodium tetracyanoaurate in stripe shape are obtained.

The above-mentioned organic solvent for extraction is selected from a group of methanol, ethanol, diethyl ether and acetone, which dissolves sodium tetracyanoaurate but not sodium chloride.

Alternatively, the second conventional method for the production of sodium tetracyanoaurate also involves a reaction of gold (III) chloride with sodium cyanide in an organic solvent. The organic solvent is selected from the group of methanol, ethanol, 1,2-ethanediol, and glycerol. At the end of reaction, the solution is adjusted to pH 5 to pH 6 by addition of hydrochloric acid to remove excess cyanide. Sodium chloride is removed by filtration, and the filtrate is concentrated to give a crude product that is further refined to pure sodium tetracyanoaurate.

By a procedure similar to the first and second conventional methods for the production of sodium tetracyanoaurate, potassium tetracyanoaurate is produced from gold (III) chloride and potassium cyanide (KCN) in either aqueous or organic solution (see FIG. 8 and Equation 9).

$$AuCl_3 + 4KCN \rightarrow KAu(CN)_4 + 3KCl \quad \text{(Eq. 9)}$$

In the above-described conventional methods for production of sodium tetracyanoaurate and potassium tetracyanoaurate, a prior manufacture of gold (III) chloride as the starting material is required. However, gold (III) chloride is usually prepared by passing chlorine gas over gold powder at 180° C., which is tedious and unfavorable for large-scale production.

Accordingly, the conventional methods for the production of the inorganic gold compound, such as tetrachloroauric acid, sodium tetrachloroaurate, potassium tetrachloroaurate, sodium tetracyanoaurate, and potassium tetracyanoaurate, are complicated, hazardous, time-consuming, costly, and environmentally harmful.

To overcome the shortcomings, a method of making an inorganic gold compound to mitigate or obviate the aforementioned problems is provided.

SUMMARY

An objective of the present invention is to provide a method of making an inorganic compound containing gold, which is simple, safe, time-effective, cost-effective, and environment-friendly, and has the advantage of high yield.

In accordance with an embodiment, the method of making the inorganic gold compound comprises the step of: treating gold with a halogen-containing oxidizing agent in a hydrochloric acid to obtain the inorganic gold compound, wherein the halogen-containing oxidizing agent is selected from the group consisting of: halous acid ($HXO_n$), halous acid salt ($MXO_n$), oxyhalide ($X_pO_q$), and combinations thereof;

X is Cl, Br, or I;
M is Na or K;
n is an integer 2;
p is an integer 1 or 2; and
q is an integer 1, 2, 3, or 5;
the halogen-containing oxidizing agent excludes chlorine gas, and the inorganic gold compound comprises tetrachloroauric acid, sodium tetrachloroaurate, or potassium tetrachloroaurate.

In accordance with an embodiment, the step of treating the gold with the halogen-containing oxidizing agent in the hydrochloric acid to obtain the inorganic gold compound further comprises: treating the gold with an oxidizing aqueous solution containing the halogen-containing oxidizing agent in the hydrochloric acid to obtain the inorganic gold compound.

The oxidizing aqueous solution contains the halogen-containing oxidizing agent and water as a solvent, and the water is distilled water or deionized water. In the oxidizing aqueous solution, a weight ratio of the halogen-containing oxidizing agent to the water ranges from 1 to 50.

In accordance with an embodiment, the step of treating the gold with the oxidizing aqueous solution in the hydrochloric acid to obtain the inorganic gold compound further comprises the step of: treating the gold with the oxidizing aqueous solution containing the halogen-containing oxidizing agent in an acidic aqueous solution containing 18 wt % to 36 wt % of the hydrochloric acid to obtain the inorganic gold compound. A volume ratio of the oxidizing aqueous solution to the acidic aqueous solution containing 18 wt % to 36 wt % of the hydrochloric acid ranges from 1 to 50.

In accordance with an embodiment, the step of treating the gold with the halogen-containing oxidizing agent in the hydrochloric acid to obtain the inorganic gold compound further comprises the step of: treating the gold with the halogen-containing oxidizing agent in the hydrochloric acid under an oxidization temperature ranging from 10° C. to 100° C. to obtain the inorganic gold compound.

In accordance with an embodiment, the step of treating the gold with the halogen-containing oxidizing agent in the hydrochloric acid to obtain the inorganic gold compound further comprises the steps of: treating the gold with the halogen-containing oxidizing agent in the hydrochloric acid to obtain a mixture; and stirring the mixture until the Au(0) is completely consumed and oxidized into Au(III), so as to obtain the inorganic gold compound.

In accordance with an embodiment, the step of treating the gold with the halogen-containing oxidizing agent in the hydrochloric acid to obtain the inorganic gold compound further comprises the steps of: treating the gold with the halogen-containing oxidizing agent in the hydrochloric acid to obtain a product solution containing the inorganic gold compound; and concentrating the product solution containing the inorganic gold compound by rotary evaporation at an evaporating temperature ranging from 50° C. to 100° C. under a pressure ranging from 0.1 mbar to 1.0 mbar to give the inorganic gold compound.

In accordance with an embodiment, the step of concentrating the product solution containing the inorganic gold compound to give the inorganic gold compound further comprises the steps of: concentrating the product solution containing the inorganic gold compound at an evaporating temperature to obtain a concentrated solution; and keeping the concentrated solution standing at a crystallization temperature ranging from 0° C. to 30° C. to give the inorganic gold compound in a crystalline form.

In accordance with an embodiment, the step of treating the gold with the halogen-containing oxidizing agent in the hydrochloric acid to obtain the inorganic gold compound further comprises the steps of:

treating the gold with the halogen-containing oxidizing agent in the hydrochloric acid to obtain an inorganic gold intermediate, wherein the inorganic gold intermediate comprises tetrachloroauric acid, sodium tetrachloroaurate, or potassium tetrachloroaurate; and reacting the inorganic gold intermediate with a cyanide by an in-situ treatment to give the inorganic gold compound, wherein the cyanide comprises sodium cyanide or potassium cyanide, and the inorganic gold compound comprises sodium tetracyanoaurate or potassium tetracyanoaurate. The cyanide comprises sodium cyanide or potassium cyanide.

In accordance with an embodiment, the molar ratio of the cyanide to the inorganic gold intermediate ranges from 1.0 to 5.0.

In accordance with an embodiment, the step of reacting the inorganic gold intermediate with the cyanide to give the inorganic gold compound further comprise the steps of: reacting the inorganic gold intermediate with the cyanide to obtain a colorless solution containing the inorganic gold compound; and concentrating the colorless solution containing the inorganic gold compound at an evaporating temperature and standing at a crystallization temperature ranging from 0° C. to 30° C. to give the inorganic gold compound in a crystalline form.

In one embodiment, tetrachloroauric acid, sodium tetrachloroaurate, or potassium tetrachloroaurate may be served as the inorganic gold compound, i.e., the final product of the method. In another embodiment, tetrachloroauric acid, sodium tetrachloroaurate, or potassium tetrachloroaurate may be served as the inorganic gold intermediate to make other final product such as sodium tetracyanoaurate or potassium tetracyanoaurate.

By the use of the halogen-containing oxidizing agent, instead of a chlorine gas, in hydrochloric acid to oxidize the gold, precaution for potential hazard of explosion as handling hydrogen peroxide, treatment for polluted gases of nitrogen oxides or chlorine gas, and prior manufacture for starting material are no more required for the method of making the inorganic gold compound in accordance with the present invention. Hence, the method of the present invention is simple, safe, time-effective, cost-effective, environment-friendly, and high-yield in producing to produce various inorganic gold compounds, such as tetrachloroaurate acid, sodium tetrachloroaurate, potassium tetrachloroaurate, sodium tetracyanoaurate and potassium tetracyanoaurate.

DEFINITIONS

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned hereunder are incorporated herein by reference. Unless mentioned otherwise, the techniques employed herein are standard methodologies well known to one of ordinary skill in the art.

It must be noted that as used herein and in the appended claims, the singular forms "a," "and," and "the" include plural referents unless the context clearly dictates otherwise. Thus, for example, reference to "a biomarker" includes a plurality of such biomarkers and reference to "the sample" includes reference to one or more samples and equivalents thereof known to those skilled in the art, and so forth. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Moreover any positively recited element of the disclosure provides basis for a negative limitation to exclude that element from the claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

Other objects, features and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

Unless otherwise defined, all technical and scientific terms used herein have the same meaning as commonly understood by one of ordinary skill in the art to which this invention pertains. In the case of conflict, the present document, including definitions will control.

Figure 1:
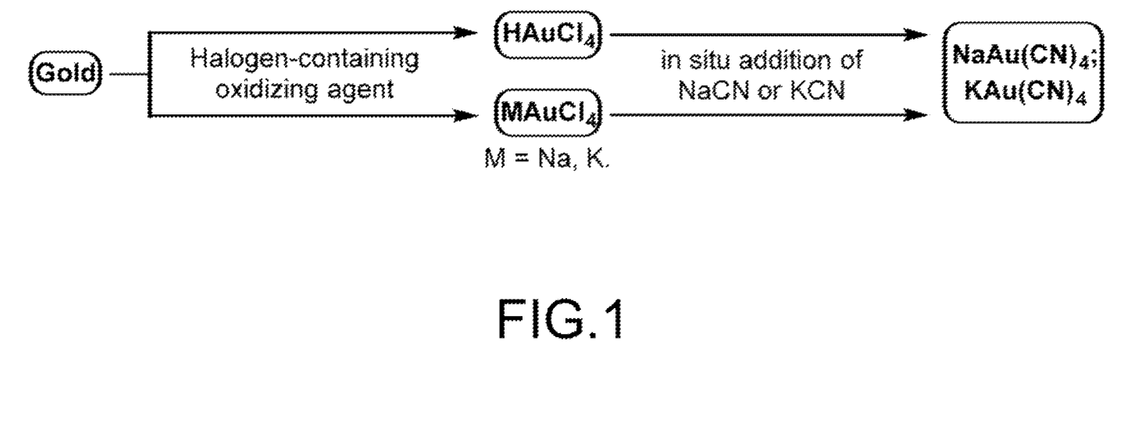
FIG. 1 is a schematic flow diagram of a method for making an inorganic gold compound in accordance with the present invention.

With reference to FIG. 1, a method of making an inorganic gold compound in accordance with the present invention, the inorganic compound which is tetrachloroauric acid, sodium tetrachloroaurate, potassium tetrachloroaurate, sodium tetracyanoaurate, or potassium tetracyanoaurate, uses a halogen-containing oxidizing agent to oxidize gold. The method of making the inorganic gold compound is performed in a single reactor without isolating an intermediate product.

In one aspect, the method of making the inorganic gold compound treats the gold in a form of powder with the halogen-containing oxidizing agent in a hydrochloric acid to produce tetrachloroauric acid.

In another aspect, the method of making the inorganic gold compound treats the gold in a form of powder with the halogen-containing oxidizing agent a hydrochloric acid to produce sodium tetrachloroaurate and potassium tetrachloroaurate.

In certain embodiments, the halogen-containing oxidizing agent is an oxy-halogen acid ($HXO_n$), wherein halogen (X) is Cl, Br or I, and n is an integer 1, 2, 3 or 4.

In certain embodiments, the halogen-containing oxidizing agent is an oxy-halogen salt ($MXO_n$), wherein halogen (X) is Cl, Br or I, M is a metal Na or K, and n is an integer 1, 2, 3 or 4.

In certain embodiments, the halogen-containing oxidizing agent is a halogen oxide ($X_pO_q$), as anhydride of oxy-halogen acid, wherein halogen (X) is Cl, Br or I, p is an integer 1 or 2, and q is an integer 1, 2, 3, or 5.

In certain embodiments, the oxy-halogen acid is selected from the group consisting of: hypochlorous acid (HClO), chlorous acid ($HClO_2$), chloric acid ($HClO_3$), perchloric acid ($HClO_4$), hypobromous acid (HBrO), bromous acid ($HBrO_2$), bromic acid ($HBrO_3$), hypoiodous acid (HIO), iodic acid ($HIO_3$), and periodic acid ($HIO_4$).

In certain embodiments, the salt of oxy-halogen acid is selected from the group consisting of: sodium hypochlorite (NaClO), potassium hypochlorite (KClO), sodium chlorite ($NaClO_2$), potassium chlorite ($KClO_2$), sodium chlorate ($NaClO_3$), potassium chlorate ($KClO_3$), sodium perchlorate ($NaClO_4$), potassium perchlorate ($KClO_4$), sodium hypobromite (NaBrO), potassium hypobromite (KBrO), sodium bromite ($NaBrO_2$), potassium bromite ($KBrO_2$), sodium bromate ($NaBrO_3$), potassium bromate ($KBrO_3$), sodium hypoiodite (NaIO), potassium hypoiodite (KIO), sodium iodate ($NaIO_3$), potassium iodate ($KIO_3$), sodium periodate ($NaIO_4$), and potassium periodate ($KIO_4$).

In certain embodiments, the halogen oxide is selected from the group consisting of: dichlorine monoxide ($Cl_2O$), dichlorine trioxide ($Cl_2O_3$), chlorine dioxide ($ClO_2$), dibromine monoxide ($Br_2O$), dibromine trioxide ($Br_2O_3$), and bromine dioxide ($BrO_2$), dibromine pentoxide ($Br_2O_5$), diiodine monoxide ($I_2O$), and diiodine pentoxide ($I_2O_5$).

In certain embodiments, dichlorine monoxide ($Cl_2O$) exists in an equilibrium with hypochlorous acid (HClO) in water (see Equation 10).

$$Cl_2O + H_2O \leftrightharpoons HOCl \quad \text{(Eq. 10)}$$

In certain embodiments, chlorine dioxide ($ClO_2$) is prepared from sodium chlorite or potassium chlorite according to Equations 11, 12 or 13 wherein M is Na or K.

$$5MClO_2 + 4HCl \rightarrow 4ClO_2 + 5MCl + 2H_2O \quad \text{(Eq. 11)}$$

$$8MClO_2 + 4H_2SO_4 \rightarrow 4ClO_2 + 2HClO_3 + 4M_2SO_4 + 2H_2O + 2HCl \quad \text{(Eq. 12)}$$

$$2MClO_2 + MOCl + 2HCl \rightarrow 2ClO_2 + 3MCl + H_2O \quad \text{(Eq. 13)}$$

In certain embodiments, dichlorine trioxide ($Cl_2O_3$), considered as the anhydride from two molecules of chlorous acid ($HClO_2$), is produced by photolysis of $ClO_2$.

In certain embodiments, dibromine monoxide ($Br_2O$) is prepared from bromine and mercuric oxide (see Equation 14).

$$2Br_2 + HgO \rightarrow Br_2O + HgBr_2 \quad \text{(Eq. 14)}$$

In certain embodiments, the reaction of bromine with ozone dioxide gives ($BrO_2$) dibromine trioxide ($Br_2O_3$) or dibromine pentoxide ($Br_2O_5$), depending on the stoichiometry (see Equations 15, 16 and 17).

$$Br_2 + 2O_3 \rightarrow BrO_2 + O_2 \quad \text{(Eq. 15)}$$

$$Br_2 + O_3 \rightarrow Br_2O_3 \quad \text{(Eq. 16)}$$

$$Br_2 + O_3 + O_2 \rightarrow Br_2O_5 \quad \text{(Eq. 17)}$$

In certain embodiments, diiodine monoxide ($I_2O$) is prepared from iodine and mercuric oxide (see Equation 18).

$$2I_2 + HgO \rightarrow I_2O + HgI_2 \quad \text{(Eq. 18)}$$

In certain embodiments, diiodine pentoxide ($I_2O_5$) is prepared by dehydrating iodic acid ($HIO_3$) as shown in Equation 19.

$$2HIO_3 \rightarrow I_2O_5 + H_2O \quad \text{(Eq. 19)}$$

In certain embodiments, two or more types of the halogen-containing oxidizing agent are applied to oxidize the gold for the production of the inorganic gold compounds. The oxidation rate of gold can be adjusted by a combined use of different types of the halogen-containing oxidizing agent.

In certain embodiments, the oxy-halogen acid is combined with the oxy-halogen salt to produce the inorganic gold compounds.

In certain embodiments, the oxy-halogen acid is combined with the halogen oxide to produce the inorganic gold compounds.

In certain embodiments, the oxy-halogen salt is combined with the halogen oxide to produce the inorganic gold compounds.

In certain embodiments, sodium chlorate ($NaClO_3$) is added with perchloric acid ($HClO_4$) to facilitate the oxidation of gold to produce sodium tetrachloroaurate.

In certain embodiments, two or more species of one type of the halogen-containing oxidizing agent are applied to oxidize the gold. The oxidation rate of gold can be adjusted by a combined use of different species of one of the types of the oxidizing agent.

In certain embodiments, two different species of oxyhalogen acid are used together for production of the inorganic gold compounds.

In certain embodiments, two different species of oxyhalogen salt are used together for production of the inorganic gold compounds.

In certain embodiments, two different species of halogen oxide are used together for production of the inorganic gold compounds.

In certain embodiments, sodium periodate ($NaIO_4$) is added with sodium perchlorate ($NaClO_4$) to facilitate the oxidation of gold to produce sodium tetrachloroaurate.

In one aspect, the gold is oxidized by the halogen-containing oxidizing agent in water as a solvent.

Preferably, the gold is gold powder.

More preferably, the gold powder has a purity of 99.9%.

Preferably, the water is distilled water.

More preferably, the water is deionized water.

In a general operation, an aqueous solution containing 18 wt % to 36 wt % of hydrochloric acid is used in the oxidation of the gold.

Preferably, an aqueous solution containing 36 wt % of hydrochloric acid of industrial grade is used.

More preferably, an aqueous solution containing 36 wt % of hydrochloric acid of electronic grade is used.

In a general operation, a weight ratio of halogen-containing oxidizing agent to the water ranges from 1 to 50.

In a general operation, the gold is oxidized under an oxidization temperature ranging from 10° C. to 100° C.

Preferable, the oxidization temperature ranges from 15° C. to 40° C.

In a general operation, the oxidation reaction of the gold is performed with stirring until the gold powder is completely consumed, and thereby obtaining a product solution containing the inorganic gold compound.

In a general operation, the solvent of the aqueous solutions is removed by evaporation from the product solution containing the inorganic gold compound.

Preferably, the solvent of the aqueous solutions is removed by rotary evaporation under reduced pressure.

More preferably, the solvent of the aqueous solution is removed at an evaporating temperature ranging from 50° C. to 100° C. under a pressure ranging from 0.1 mbar to 1.0 mbar.

In another aspect, the method of making the inorganic gold compound in-situ synthesizes sodium tetracyanoaurate and potassium tetracyanoaurate from the intermediate products of tetrachloroauric acid, sodium tetrachloroaurate and potassium tetrachloroaurate without prior isolation.

Preferably, the intermediate products of tetrachloroauric acid, sodium tetrachloroaurate and potassium tetrachloroaurate are in-situ synthesized under an in-situ synthesizing temperature ranging from 10° C. to 60° C.

In certain embodiments, tetrachloroauric acid prepared from the gold is treated in situ with sodium cyanide to give sodium tetracyanoaurate.

Preferably, the molar ratio of sodium cyanide to tetrachloroauric acid ranges from 1.0 to 1.1.

In certain embodiments, tetrachloroauric acid prepared from gold is treated in situ with potassium cyanide to give potassium tetracyanoaurate.

Preferably, the molar ratio of potassium cyanide to tetrachloroauric acid ranges from 1.0 to 1.1.

In certain embodiments, sodium tetrachloroaurate prepared from the gold is treated in situ with sodium cyanide to give sodium tetracyanoaurate.

Preferably, the molar ratio of sodium cyanide to sodium tetrachloroaurate ranges from 1.0 to 1.1.

In certain embodiments, potassium tetrachloroaurate prepared from the gold is treated in situ with potassium cyanide to give potassium tetracyanoaurate.

Preferably, the molar ratio of potassium cyanide to potassium tetrachloroaurate ranges from 1.0 to 1.1.

The prepared intermediate products of tetrachloroauric acid, sodium tetrachloroaurate, potassium tetrachloroaurate, sodium tetracyanoaurate, and potassium tetracyanoaurate are crystallized from water.

Preferably, the crystallization temperature of the prepared intermediate products of tetrachloroauric acid, sodium tetrachloroaurate, potassium tetrachloroaurate, sodium tetracyanoaurate, and potassium tetracyanoaurate ranges from 0° C. to 30° C.

The inorganic gold compound made from the method, including tetrachloroauric acid, sodium tetrachloroaurate, potassium tetrachloroaurate, sodium tetracyanoaurate and potassium tetracyanoaurate, is greater than 99% purity as shown by inductively coupled plasma optical emission spectrometry (ICP-OES).

Figure 2:
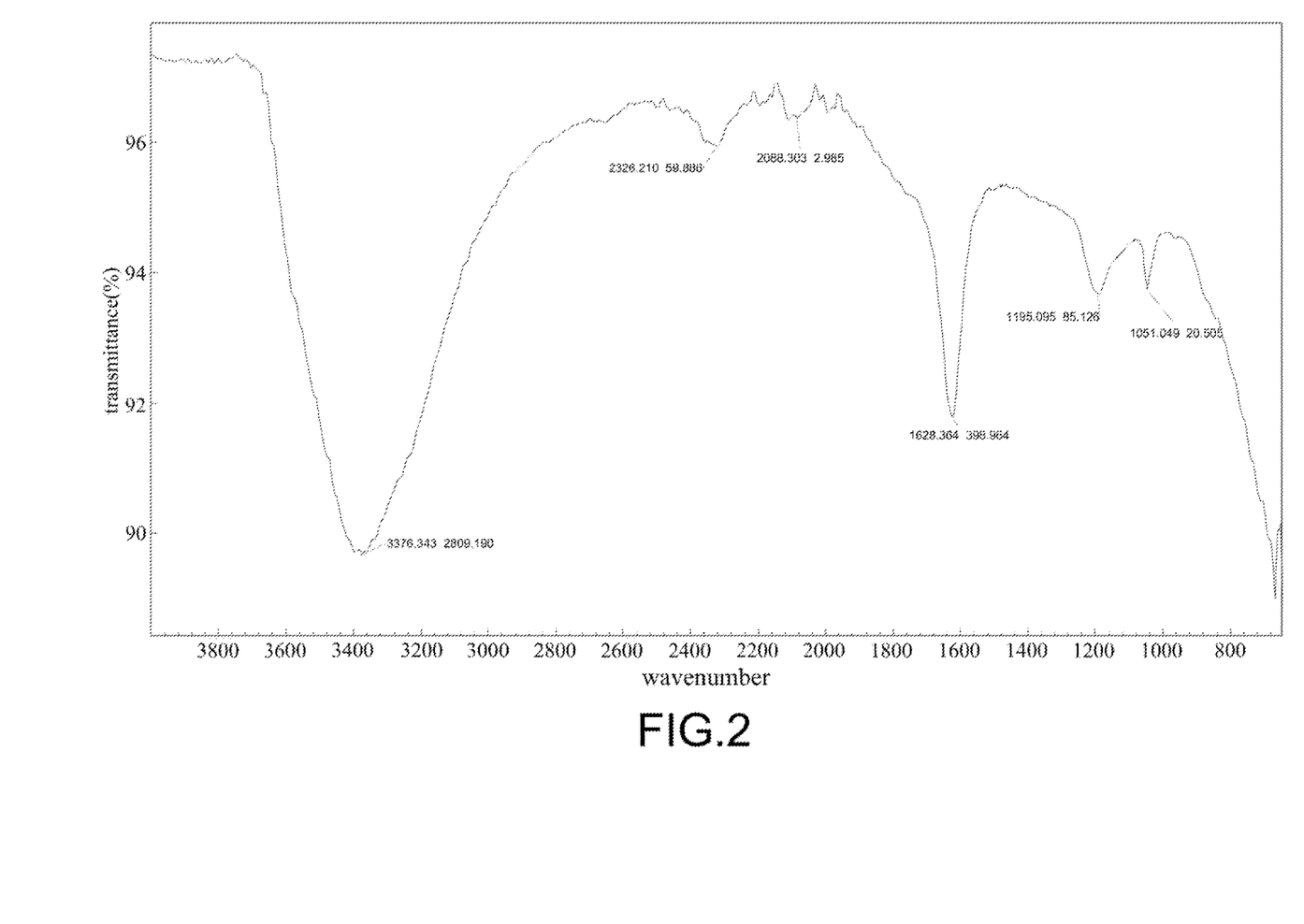
FIG. 2 is an infrared spectrum of $HAuCl_4$ made from a method for making an inorganic gold compound in accordance with the present invention.
Figure 3:
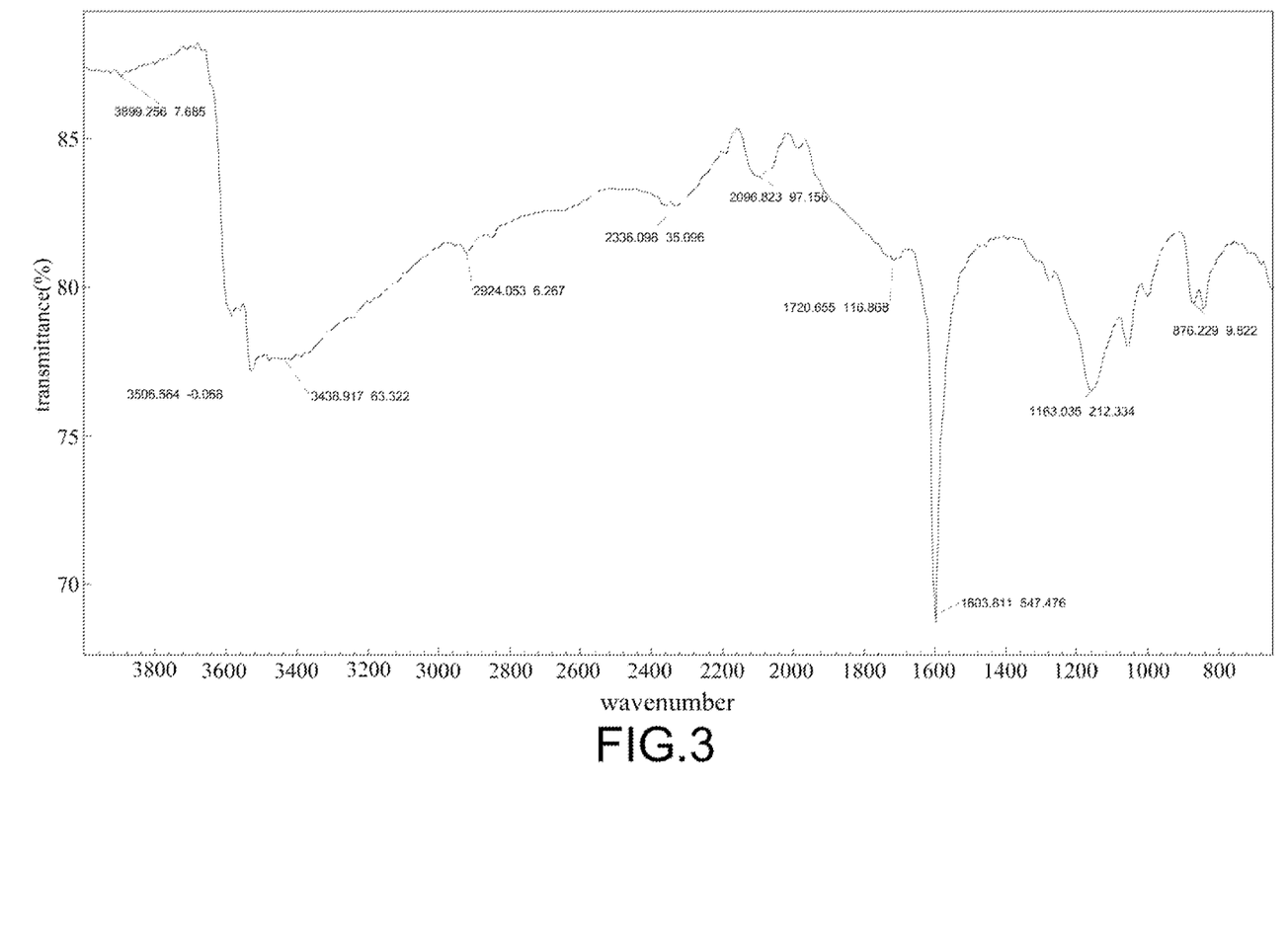
FIG. 3 is an infrared spectrum of $KAuCl_4$ made from a method for making an inorganic gold compound in accordance with the present invention.

The inorganic gold compound made from the method is confirmed by infrared (IR) spectrum. FIG. 2 shows an IR spectrum of tetrachloroauric acid made from the method. FIG. 3 shows an IR spectrum of potassium tetrachloroaurate made from the method.

Figure 4:
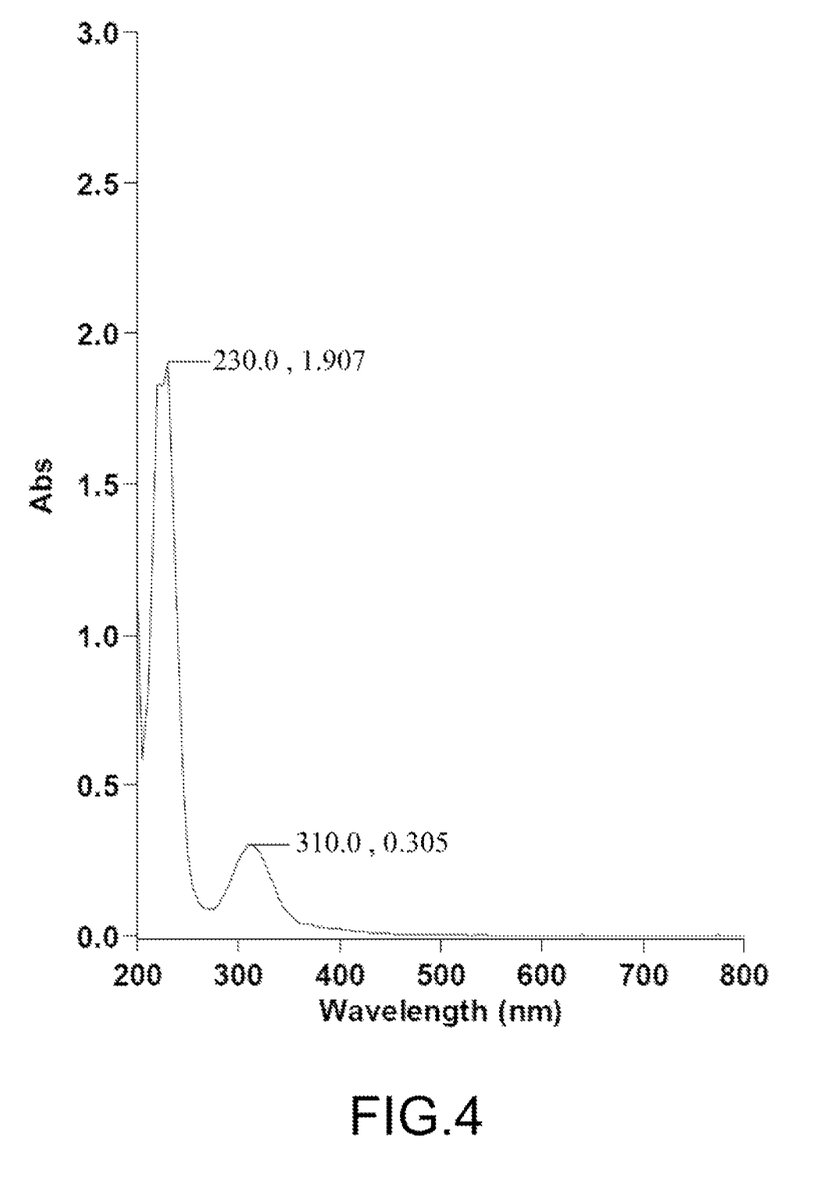
FIG. 4 is an UV-vis spectrum of $HAuCl_4$ (in 0.1 M HCl aqueous solution) made from a method for making an inorganic gold compound in accordance with the present invention.
Figure 5:
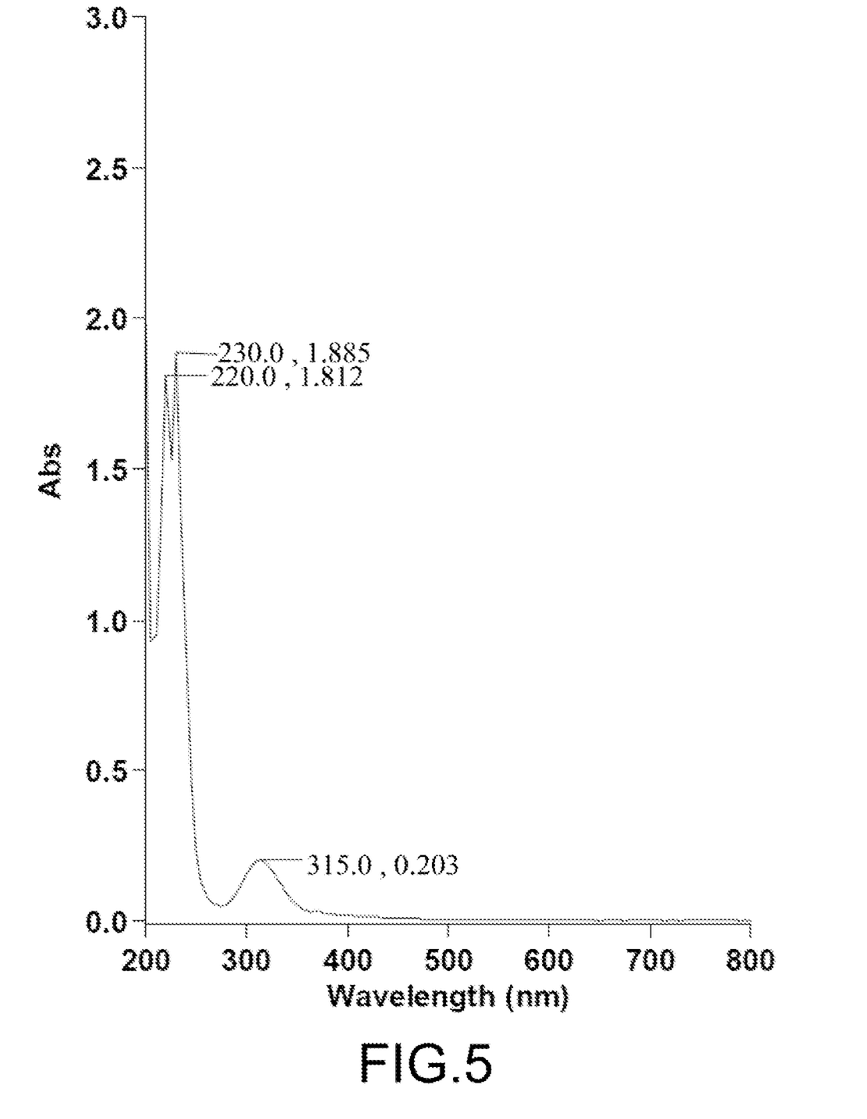
FIG. 5 is an UV-vis spectrum of $KAuCl_4$ (in 0.1 M HCl aqueous solution) made from a method for making an inorganic gold compound in accordance with the present invention.

The ultraviolet-visible (UV-vis) spectrum of the inorganic gold compound made from the method is measured. As shown in FIG. 4, an UV-vis spectrum of tetrachloroauric acid in 0.1 M HCl aqueous solution shows a characteristic absorption at $\lambda_{max}$=310 nm. As shown in FIG. 5, an UV-vis spectrum of potassium tetrachloroaurate in 0.1 M HCl aqueous solution shows a characteristic absorption at $\lambda_{max}$=315 nm.

Figure 6:
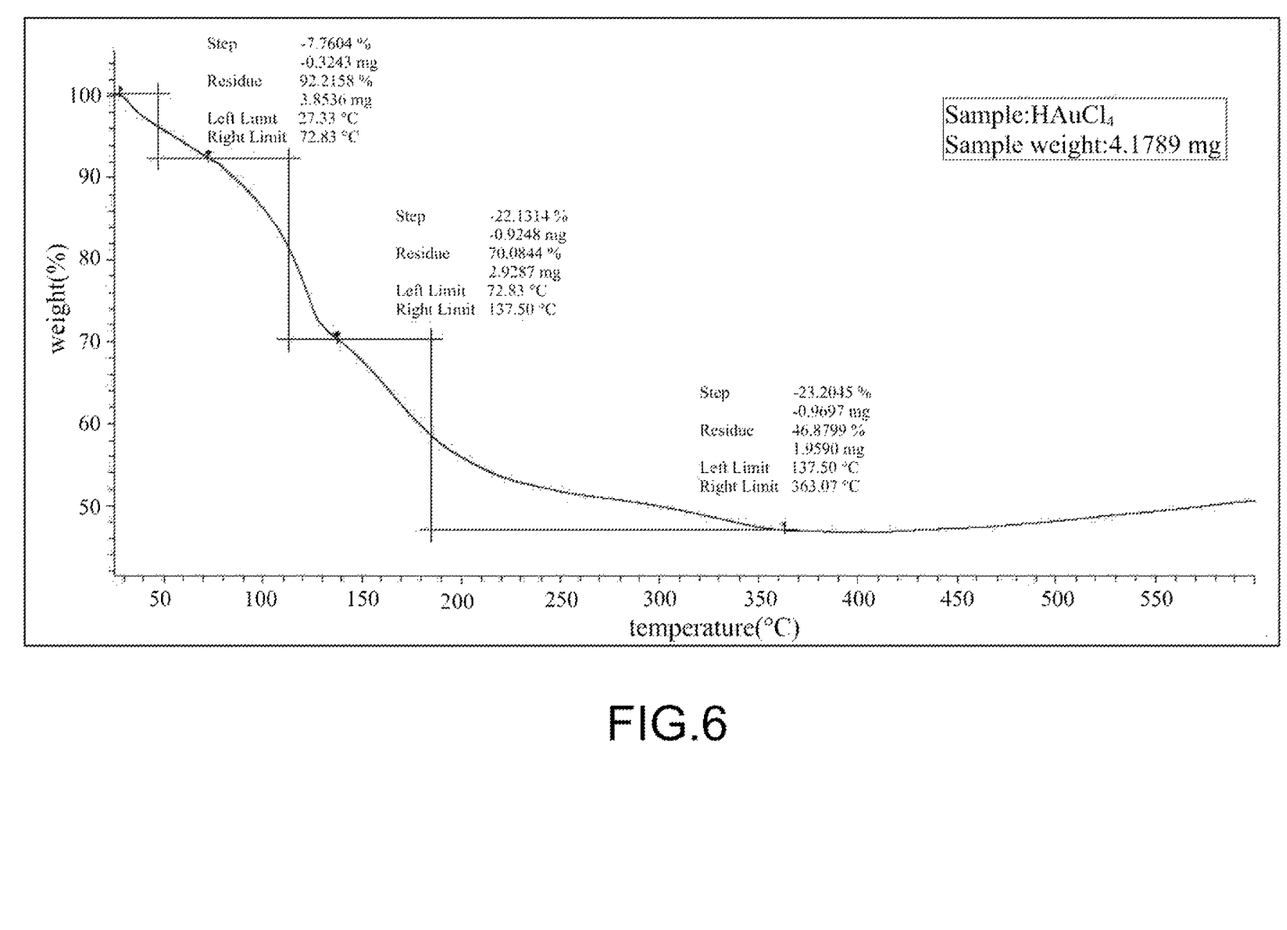
FIG. 6 is a TGA diagram of $HAuCl_4$ made from a method for making an inorganic gold compound in accordance with the present invention.
Figure 7:
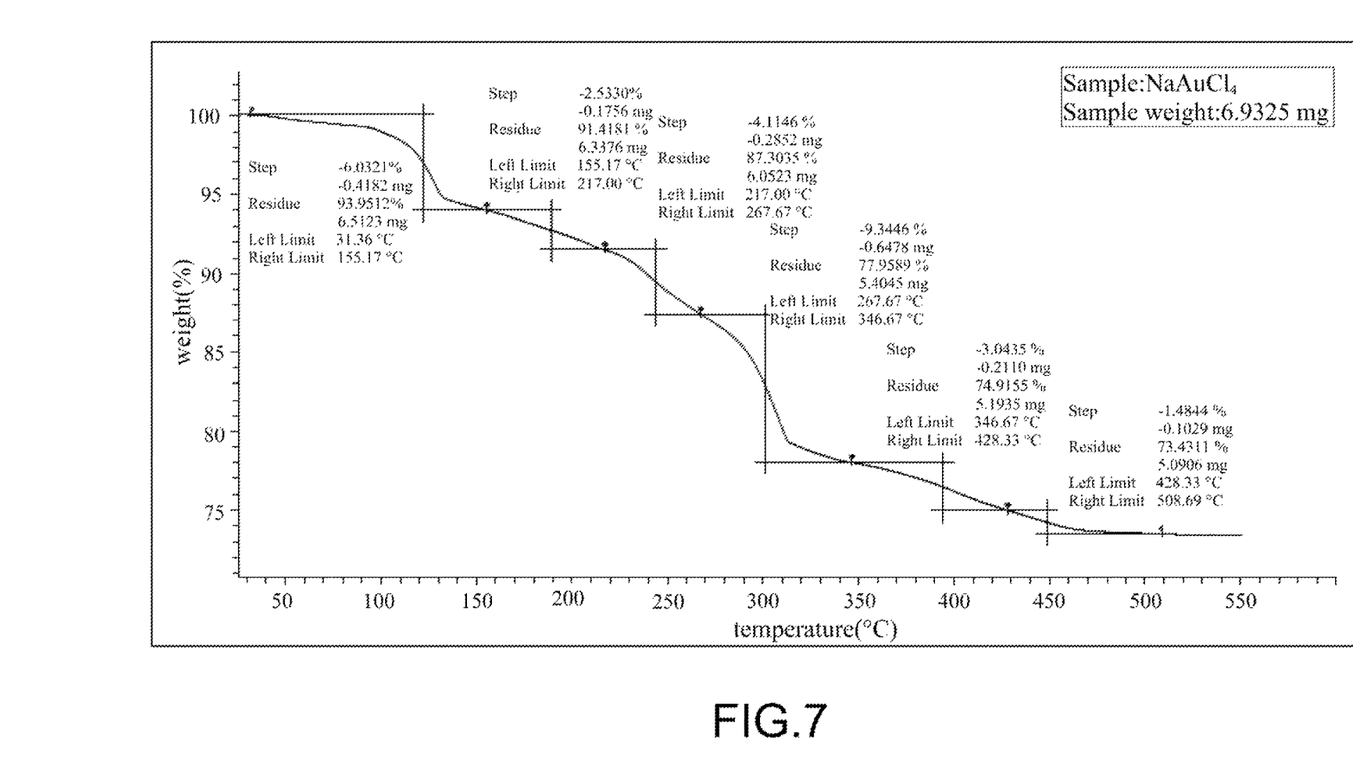
FIG. 7 is a TGA diagram of $NaAuCl_4$ made from a method for making an inorganic gold compound in accordance with the present invention.

Tetrachloroauric acid made from the method is distinguished from the gold salt made from the method by thermal gravimetric analysis (TGA). As shown in FIGS. 6 and 7, tetrachloroauric acid made from the method is distinguished from sodium tetrachloroaurate made from the method by TGA.

In comparison with the previously reported methods for oxidation of gold using aqua regia, chlorine and hydrogen peroxide, the method of making the inorganic gold compound in accordance with the present invention is more efficient and environmental friendly.

Without intent to limit the scope of the invention, exemplary instruments, apparatus, methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

In the following examples and comparative example, IR spectra were recorded on Agilent Technologies Cary630 FT-IR spectrometer. UV-vis spectra were measured on Agilent Technologies Cary60 UV-Vis spectrophotometer. ICP-OES was performed on Perkin Elmer optima 8X00 spectrometer. TGA was performed on Mettler Toledo TGA/DSC 3+ instrument. Rotary evaporation was performed on IKA RV10 rotary evaporator under reduced pressure. All the reagents were reagent grade purchased from Acros Organics and were used without further purification. Gold powder was in 99.9% purity. Water is distilled or deionized for use as a solvent.

Comparative Example

Synthesis of Sodium Tetrachloroaurate Using Hydrogen Peroxide in Hydrochloric Acid Gold powder (5 g) and concentrated HCl (125 mL of aqueous solution containing 36 wt % of hydrochloric acid) were placed in a 500 mL flat-bottomed flask, which was equipped with a condenser on the top, to obtain a former mixture. The former mixture was heated at 100° C., and was slowly added with $H_2O_2$ (50 mL of aqueous solution containing 30 wt % of $H_2O_2$) by portions, taking precaution of bubbling and overspill of solution due to the vigorous reaction. The gold powder was completely consumed in 20 min, and the solution was concentrated by rotary evaporation at 100° C. to give a crude product of tetrachloroauric acid (8.5 g). To a solution of the crude product of tetrachloroauric acid in water (20 mL) was added sodium chloride (1.5 g) and thereby obtaining a latter mixture. The latter mixture was stirred for 20 min, and then concentrated by rotary evaporation at 100° C. to give sodium tetrachloroaurate (9.9 g, 98.4% yield from gold).

Example 1

Synthesis of Sodium Tetrachloroaurate Using Sodium Chlorite in Hydrochloric Acid Gold powder (5 g) and concentrated HCl (125 mL of aqueous solution containing 36 wt % of hydrochloric acid) were placed in a 250 mL flat-bottomed flask. 5 mL of aqueous solution containing 5 wt % of sodium chlorite ($NaClO_2$) was added into the flask and a mixture was obtained. The mixture was stirred for 10 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 2

Synthesis of Sodium Tetrachloroaurate Using Sodium Chlorate in Hydrochloric Acid Gold powder (0.5 g) and concentrated HCl (25 mL of aqueous solution containing 36 wt % of hydrochloric acid) were placed in a 100 mL flat-bottomed flask. 5 mL of aqueous solution containing 5 wt % of sodium chlorate ($NaClO_3$) was added into the flask and a mixture was obtained. The mixture was stirred for 10 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 3

Synthesis of Tetrachloroauric Acid Using Iodic Acid in Hydrochloric Acid

Gold powder (0.5 g) and concentrated HCl (25 mL of aqueous solution containing 36 wt % of hydrochloric acid) were placed in a 100 mL flat-bottomed flask. 5 mL of aqueous solution containing 5 wt % of iodic acid ($HIO_3$) was added into the flask and a mixture was obtained. The mixture was stirred for 5 min until the gold powder was consumed to obtain a product solution containing hydrochloric acid. The product solution was concentrated by rotary evaporation at 100° C. under a pressure of 0.5 mbar and stood at room temperature to give crystalline hydrochloric acid (>99% yield).

Example 4

Synthesis of Potassium Tetrachloroaurate Using Potassium Iodate in Hydrochloric Acid Gold powder (0.5 g) and concentrated HCl (25 mL of aqueous solution containing 36 wt % of hydrochloric acid) were placed in a 100 mL flat-bottomed flask. 5 mL of aqueous solution containing 5 wt % of potassium iodate ($KIO_3$) was added into the flask and a mixture was obtained. The mixture was stirred for 5 min until the gold powder was consumed to obtain a product solution containing potassium tetrachloroaurate. The product solution was concentrated by rotary evaporation at 100° C. under a pressure of 0.5 mbar and stood at room temperature to give crystalline potassium tetrachloroaurate (>99% yield).

Example 5

Synthesis of Sodium Tetrachloroaurate Using Sodium Periodate in Hydrochloric Acid Gold powder (0.5 g) and concentrated HCl (25 mL of aqueous solution containing 36 wt % of hydrochloric acid) were placed in a 100 mL flat-bottomed flask. 5 mL of aqueous solution containing 5 wt % of sodium periodate ($NaIO_4$) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 6

Synthesis of Sodium Tetrachloroaurate Using Sodium Chlorate and Sodium Perchlorate in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium chlorate ($NaClO_3$, 1 g) and sodium perchlorate ($NaClO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 7

Synthesis of Sodium Tetrachloroaurate Using Sodium Chlorate and Perchloric Acid in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium chlorate ($NaClO_3$, 1 g) and perchloric acid ($HClO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 8

Synthesis of Sodium Tetrachloroaurate Using Sodium Periodate and Perchloric Acid in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium periodate ($NaIO_4$, 1 g) and perchloric acid ($HClO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 9

Synthesis of Sodium Tetrachloroaurate Using Sodium Periodate and Sodium Perchlorate in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium periodate ($NaIO_4$, 1 g) and sodium perchlorate ($NaClO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 10

Synthesis of Sodium Tetrachloroaurate Using Sodium Chlorite and Sodium Perchlorate in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium chlorite ($NaClO_2$, 1 g) and sodium perchlorate ($NaClO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 11

Synthesis of Sodium Tetrachloroaurate Using Sodium Chlorite and Perchloric Acid in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium chlorite ($NaClO_2$, 1 g) and perchloric acid ($HClO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 12

Synthesis of Sodium Tetrachloroaurate Using Sodium Hypochlorite and Sodium Chlorite in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium hypochlorite (NaClO, 1 g) and sodium chlorite ($NaClO_2$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 13

Synthesis of Sodium Tetrachloroaurate Using Sodium Chlorite and Sodium Chlorate in Hydrochloric Acid Gold powder (0.5 g) and concentrated HCl (25 mL of aqueous solution containing 36 wt % of hydrochloric acid) were placed in a 100 mL flat-bottomed flask. An aqueous solution (5 mL) containing sodium chlorite ($NaClO_2$, 1 g) and sodium chlorate ($NaClO_3$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 14

Synthesis of Sodium Tetrachloroaurate Using Potassium Iodate and Perchloric Acid in Hydrochloric Acid

Gold powder (0.5 g) and concentrated HCl (25 mL of aqueous solution containing 36 wt % of hydrochloric acid) were placed in a 100 mL flat-bottomed flask. An aqueous solution (5 mL) containing sodium periodate ($NaIO_4$, 1 g) and perchloric acid ($HClO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 15

Synthesis of Sodium Tetrachloroaurate Using Sodium Chlorate and Sodium Periodate in Hydrochloric Acid

Gold powder (0.5 g) and concentrated HCl (25 mL of aqueous solution containing 36 wt % of hydrochloric acid) were placed in a 100 mL flat-bottomed flask. An aqueous solution (5 mL) containing sodium chlorate ($NaClO_3$, 1 g) and sodium periodate ($NaIO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 16

Synthesis of Sodium Tetrachloroaurate Using Sodium Chlorite and Sodium Periodate in Hydrochloric Acid

Gold powder (0.5 g) and concentrated HCl (25 mL of aqueous solution containing 36 wt % of hydrochloric acid) were placed in a 100 mL flat-bottomed flask. An aqueous solution (5 mL) containing sodium chlorite ($NaClO_2$, 1 g) and sodium periodate ($NaIO_4$, 1 g) was added into the flask and a mixture was obtained. The mixture was stirred for 5 min until the gold powder was consumed to obtain a product solution containing sodium tetrachloroaurate. The product solution was concentrated by rotary evaporation at 100° C. under a pressure of 0.5 mbar and stood at room temperature to give crystalline sodium tetrachloroaurate (>99% yield).

Example 17

Synthesis of Sodium Tetracyanoaurate Using Sodium Chlorite in Hydrochloric Acid, Followed by in Situ Treatment with Sodium Cyanide

Gold powder (5 g) and concentrated HCl (125 mL of aqueous solution containing 36 wt % of hydrochloric acid) were placed in a 250 mL flat-bottomed flask. An aqueous solution (50 mL) containing 5 wt % of sodium chlorite ($NaClO_2$) was added into the flask, thereby obtaining a first mixture of gold powder, concentrated HCl, and the aqueous solution containing 5 wt % of $NaClO_2$. The first mixture was stirred for 10 min until the gold powder was consumed to obtain an intermediate product solution containing sodium tetrachloroaurate. The intermediate product solution was concentrated by rotary evaporation at 100° C. under a pressure of 0.5 mbar and cooled to room temperature to give crystalline sodium tetrachloroaurate.

Subsequently, crystalline sodium tetrachloroaurate was in situ treated with sodium cyanide as follows: crystalline sodium tetrachloroaurate was added with an aqueous solution of sodium cyanide (5.6 g in 20 mL of water) to form a second mixture. The second mixture was stirred for 30 min until it became a clear colorless solution. The clear colorless solution contained sodium tetracyanoaurate.

Afterwards, the clear colorless solution was extracted and concentrated to give potassium tetracyanoaurate as follows: an 80 wt % 1,2-ethanediol aqueous solution (50 mL) was added to the clear colorless solution to obtain a third mixture. The third mixture was heated at 100° C. to remove water. This procedure was repeated by adding another batch of 80% 1,2-ethanediol aqueous solution (50 mL) and heating at 100° C. for another 30 min to obtain a residue containing sodium tetracyanoaurate. The residue was concentrated by rotary evaporation under reduced pressure, and sodium tetracyanoaurate was obtained as stripe crystals (8.0 g, 97.6% yield) on standing at room temperature.

Example 18

Synthesis of Potassium Tetracyanoaurate Using Potassium Chlorite in Hydrochloric Acid, Followed by in Situ Treatment with Potassium Cyanide

In a 250 mL flask was placed concentrated HCl (125 mL of aqueous solution containing 36 wt % of hydrochloric acid), and an aqueous solution (50 mL) containing 10 wt % of potassium chlorite ($KClO_2$) was added at room temperature, so that a gas was generated. The generated gas, which was chlorine dioxide ($ClO_2$) was bubbled into another flask containing gold powder (1 g) and concentrated HCl (100 mL of aqueous solution containing 36 wt % of hydrochloric acid), thereby obtaining a first mixture of gold powder, concentrated HCl, and the generated gas. The first mixture of gold powder, concentrated HCl, and the generated gas was stirred at room temperature for 10 min until gold powder was consumed to obtain an intermediate product solution containing tetrachloroauric acid. The intermediate product solution was concentrated by rotary evaporation at 100° C. under a pressure of 0.5 mbar and cooled to room temperature to give crystalline tetrachloroauric acid.

Subsequently, crystalline tetrachloroauric acid was in situ treated with potassium cyanide as follows: crystalline tetrachloroauric acid was added with an aqueous solution of potassium cyanide (1.5 g in 10 mL of water) and a second mixture was obtained. The second mixture was stirred for 30 min until it became a clear colorless solution. The clear colorless solution contained potassium tetracyanoaurate.

Afterwards, the clear colorless solution was extracted and concentrated to give potassium tetracyanoaurate as follows: an 80 wt % 1,2-ethanediol aqueous solution (30 mL) was added to the clear colorless solution to obtain a third mixture. The third mixture was heated at 100° C. for removal of water. This procedure was repeated by adding another batch of 80% 1,2-ethanediol aqueous solution (30 mL) and heating at 100° C. for another 30 min, thereby obtaining a residue containing potassium tetracyanoaurate. The residue was concentrated by rotary evaporation under reduced pressure, and potassium tetracyanoaurate was obtained as stripe crystals (1.69 g, 98.1% yield) on standing at room temperature.

Compare with the comparative example, by the using of the halogen-containing oxidizing agent, such as $HIO_3$, $HClO_4$, $NaClO_2$, $NaClO_3$, $NaClO_4$, $KIO_3$, $NaIO_4$, and $ClO_2$, which was not a chlorine gas, in hydrochloric acid to oxidize the gold, examples 1 to 16 made the inorganic gold compound, such as tetrachloroauric acid, sodium tetrachloroaurate, potassium tetrachloroaurate, without the need of taking a precaution for vigorous reaction.

Different types or species of the halogen-containing oxidizing agent can be used together to adjust the oxidation rate of gold. A combined use of halogen-oxidizing agents may reduce the time in oxidation of gold, so as to further enhance the cost-effectiveness of industrial production of the inorganic gold compounds.

In addition, as shown in examples 17 and 18, by the using of the halogen-containing oxidizing agent in hydrochloric acid to oxidize the gold, sodium tetracyanoaurate and potassium tetracyanoaurate were made by in situ treating sodium tetrachloroaurate and tetrachloroauric acid with sodium cyanide and potassium cyanide, instead of using gold(III) chloride as starting material for production of sodium tetracyanoaurate and potassium tetracyanoaurate.

Based on the example above, the method of making the inorganic gold compound in accordance with the present invention was simple, safe, time-effective, cost-effective, and environment-friendly, and has the advantage of high yield.

What is claimed is:

1. A method of making an inorganic gold compound, the method comprising the step of:
    treating gold with a halogen-containing oxidizing agent in a hydrochloric acid to obtain the inorganic gold compound,
    wherein the halogen-containing oxidizing agent is selected from the group consisting of: halous acid ($HXO_n$), halous acid salt ($MXO_n$), oxyhalide ($X_pO_q$), and combinations thereof,
    wherein
    X is Br, or I;
    M is Na or K;
    n is an integer 2;
    p is an integer 1 or 2; and
    q is an integer 1, 2, 3, or 5; and
    wherein the halogen-containing oxidizing agent excludes chlorine gas, and the inorganic gold compound comprises tetrachloroauric acid, sodium tetrachloroaurate, or potassium tetrachloroaurate.

2. The method of making the inorganic gold compound as claimed in claim 1, wherein:
    the halogen-containing oxidizing agent is the oxy-halogen acid; and
    the oxy-halogen acid is $HBrO_2$.

3. The method of making the inorganic gold compound as claimed in claim 1, wherein:
    the halogen-containing oxidizing agent is the oxy-halogen salt; and
    the oxy-halogen salt is selected from the group consisting of: $NaBrO_2$, $KBrO_2$, and combinations thereof.

4. The method of making the inorganic gold compound as claimed in claim 1, wherein:
    the halogen-containing oxidizing agent is the halogen oxide; and
    the halogen oxide is selected from the group consisting of: $Br_2O$, $Br_2O_3$, $BrO_2$, $Br_2O_5$, $I_2O$, $I_2O_5$, and combinations thereof.

5. The method of making the inorganic gold compound as claimed in claim 1, wherein the step of treating the gold with the halogen-containing oxidizing agent in the hydrochloric acid to obtain the inorganic gold compound further comprises:
    treating the gold with an oxidizing aqueous solution in the hydrochloric acid to obtain the inorganic gold compound, wherein the oxidizing aqueous solution contains the halogen-containing oxidizing agent and water.

6. The method of making the inorganic gold compound as claimed in claim 5, wherein a weight ratio of the halogen-containing oxidizing agent to the water in the oxidizing aqueous solution ranges from 1 to 50.

7. The method of making the inorganic gold compound as claimed in claim 1, wherein the step of treating the gold with the halogen-containing oxidizing agent in the hydrochloric acid to obtain the inorganic gold compound further comprises the step of:
    treating the gold with the halogen-containing oxidizing agent in an acidic aqueous solution containing 18 wt % to 36 wt % of the hydrochloric acid to obtain the inorganic gold compound.

8. The method of making the inorganic gold compound as claimed in claim 6, wherein the step of treating the gold with the aqueous solution containing the halogen-containing oxidizing agent in the hydrochloric acid to obtain the inorganic gold compound further comprises the step of:
    treating the gold with the oxidizing aqueous solution in an acidic aqueous solution containing 18 wt % to 36 wt % of the hydrochloric acid to obtain the inorganic gold compound, wherein a volume ratio of the oxidizing aqueous solution to the acidic aqueous solution containing 18 wt % to 36 wt % of the hydrochloric acid ranges from 1 to 50.

9. The method of making the inorganic gold compound as claimed in claim 1, wherein the step of treating the gold with the halogen-containing oxidizing agent in the hydrochloric acid to obtain the inorganic gold compound further comprises the step of:
    treating the gold with the halogen-containing oxidizing agent in the hydrochloric acid under an oxidization temperature ranging from 10° C. to 100° C. to obtain the inorganic gold compound.

10. The method of making the inorganic gold compound as claimed in claim 1, wherein the step of treating the gold with the halogen-containing oxidizing agent in the hydrochloric acid to obtain the inorganic gold compound further comprises the steps of:
    mixing the gold with the halogen-containing oxidizing agent in the hydrochloric acid to obtain a mixture; and
    stirring the mixture until the gold is oxidized, so as to obtain the inorganic gold compound.

11. The method of making the inorganic gold compound as claimed in claim 1, wherein the step of treating the gold with the halogen-containing oxidizing agent in the hydrochloric acid to obtain the inorganic gold compound further comprises the steps of:
    mixing the gold with the halogen-containing oxidizing agent in the hydrochloric acid to obtain a product solution; and
    concentrating the product solution to give the inorganic gold compound.

12. The method of making the inorganic gold compound as claimed in claim 11, wherein the step of concentrating the product solution to give the inorganic gold compound further comprises the step of:
concentrating the product solution by rotary evaporation at an evaporating temperature ranging from 50° C. to 100° C. under a pressure ranging from 0.1 mbar to 1.0 mbar to give the inorganic gold compound.

13. The method of making the inorganic gold compound as claimed in claim 11, wherein the step of concentrating the product solution to give the inorganic gold compound further comprises the steps of:
concentrating the product solution at an evaporating temperature to obtain a concentrated solution; and
keeping the concentrated solution standing at a crystallization temperature ranging from 0° C. to 30° C. to give the inorganic gold compound in a crystalline form.

14. A method of making an inorganic gold compound, comprising the steps of:
treating gold with a halogen-containing oxidizing agent in a hydrochloric acid to obtain an inorganic gold intermediate,
wherein the halogen-containing oxidizing agent is selected from the group consisting of: halous acid ($HXO_n$), halous acid salt ($MXO_n$), oxyhalide ($X_pO_q$), and combinations thereof,
wherein
X is Br, or I;
M is Na or K;
n is an integer 2;
p is an integer 1 or 2; and
q is an integer 1, 2, 3, or 5; and
wherein the halogen-containing oxidizing agent excludes chlorine gas, and the inorganic gold intermediate comprises tetrachloroauric acid, sodium tetrachloroaurate, or potassium tetrachloroaurate; and
reacting the inorganic gold intermediate with a cyanide to give the inorganic gold compound, wherein the cyanide comprises sodium cyanide or potassium cyanide, and the inorganic gold compound comprises sodium tetracyanoaurate or potassium tetracyanoaurate.

15. The method of making the inorganic gold compound as claimed in claim 14, wherein the molar ratio of the cyanide to the inorganic gold intermediate ranges from 1.0 to 5.0.

16. The method of making the inorganic gold compound as claimed in claim 14, wherein the step of reacting the inorganic gold intermediate with the cyanide to give the inorganic gold compound further comprises the steps of:
reacting the inorganic gold intermediate with the cyanide to obtain a colorless solution containing the inorganic gold compound;
concentrating the colorless solution containing the inorganic gold compound at an evaporating temperature; and then
standing at a crystallization temperature ranging from 0° C. to 30° C. to give the inorganic gold compound in a crystalline form.

\* \* \* \* \*